US008407674B2

(12) United States Patent
Krauss

(10) Patent No.: US 8,407,674 B2
(45) Date of Patent: Mar. 26, 2013

(54) DETECTING THREAD STARVATION

(75) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1215 days.

(21) Appl. No.: 12/028,443

(22) Filed: Feb. 8, 2008

(65) Prior Publication Data
US 2009/0204948 A1    Aug. 13, 2009

(51) Int. Cl.
G06F 9/44    (2006.01)
(52) U.S. Cl. .......................... 717/127; 718/103
(58) Field of Classification Search .................. 717/127; 718/103
See application file for complete search history.

(56) References Cited

U.S. PATENT DOCUMENTS
2005/0102677 A1*  5/2005  Gootherts ..................... 718/105

OTHER PUBLICATIONS

Parekh et al. ("Thread-Sensitive Scheduling for SMT Processors", 2000).*

Vetter et al. ("Dynamic Software Testing of MPI Applications with Umpire," 2000).*
Rational Quantify Quick Reference, pp. 1-4, copyright 1992, 2001 Rational Software Corporation.

* cited by examiner

Primary Examiner — Li B Zhen
Assistant Examiner — Lenin Paulino
(74) Attorney, Agent, or Firm — Cantor Colburn LLP; Jeff Tang

(57) ABSTRACT

Thread starvation is indicated for a program under test while the program is running. Beginning with a least frequently used thread in a list of thread tracking structures, if recorded events are currently listed for the thread, thread starvation is detected based on a percentage of the recorded events that took place while other threads were waiting a synchronization object held by the thread. If no recorded events are listed for the thread, the percentage of recorded of events that take place while other threads were waiting for synchronization object held by the thread does not exceed the predetermined percentage, and there are timestamps currently listed for the thread and the thread is currently waiting for a synchronization object, thread starvation is detected based on a percentage of time the thread has been waiting for the synchronization object. Thread starvation detection is repeated for each of the remaining threads in the list of thread tracking structure, beginning with the next to least frequently active thread.

17 Claims, 12 Drawing Sheets

DETECTING THREAD STARVATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

This invention relates to runtime analysis of computer programs, also known as dynamic analysis. This invention more particularly relates to detection of thread starvation and, more particularly, to detection of thread starvation in a running computer program that has been instrumented such that the program's system calls are intercepted for use during runtime analysis to detect thread starvation in the running program.

Thread starvation occurs whenever few or no CPU cycles are available to execute a particular thread in a program. This situation typically arises when threads of mixed priorities are created, if the higher-priority threads hog the CPU while locks are held.

A real-world scenario in which thread starvation occurs is when a relatively low-priority thread requires one or more locks that are often held by relatively high-priority threads. In this scenario, the lower-priority thread is starved during time intervals in which a higher-priority thread is holding a lock required by the lower-priority thread, more often than not, when time slices arrive during which the lower-priority thread could have executed.

Another situation in which thread starvation occurs is when a relatively low-priority thread holds a lock while relatively high-priority threads waiting for that lock consume CPU cycles. In this scenario, the lower-priority thread is starved during time intervals in which one or more higher-priority threads are busily waiting for a lock held by the lower-priority thread, so that the lower-priority thread runs only during rarely available time slices.

Depending on the operating system, the above scenarios can cause necessary execution to be postponed much longer than necessary. Or, that execution may not occur at all. A software application's behavior while thread starvation occurs, as perceived by its user, may be hung up, or it may have very slow progress, or it may fail to produce a result within an expected timeframe.

To figure out why performance is draggy, developers deploy runtime analysis tools to analyze software application behavior. The typical tool of choice is a performance profiling tool. However, current profiling tools do not indicate thread starvation as a cause of poor performance. Thus, it is up to a software application's developers to figure out when thread starvation is causing poor performance. For some performance profiling tools, the profiling results may point out functions called by the starved thread, indicating that those functions run slowly, but there is no indication of why those functions run slowly. For other tools, which calculate time spent by summing up clock cycles per instruction, the slowly-running functions executed by the starved thread may not be indicated at all in the profiling results.

SUMMARY

According to an exemplary embodiment of the present invention, a method, computer program product, and apparatus are provided for detecting thread starvation in a running program under test. Beginning with a least frequently used active thread in a list of thread tracking structures, a determination is made whether recorded events are currently listed for the thread. If recorded events are currently listed for the thread, a determination is made whether more than a predetermined percentage of recorded events took place while other threads were waiting for a synchronization object held by the thread. If more than the predetermined percentage of recorded events took place while other threads were waiting for the synchronization object held by the thread, detection of thread starvation is indicated while the program under test is running.

BRIEF DESCRIPTION OF THE DRAWINGS

The subject matter, which is regarded as the invention, is particularly pointed out and distinctly claimed in the enumerated list of claims at the conclusion of the specification. The foregoing and other objects, features, and advantages of the invention are apparent from the following detailed description taken in conjunction with the accompanying drawings in which:

Figure 1:
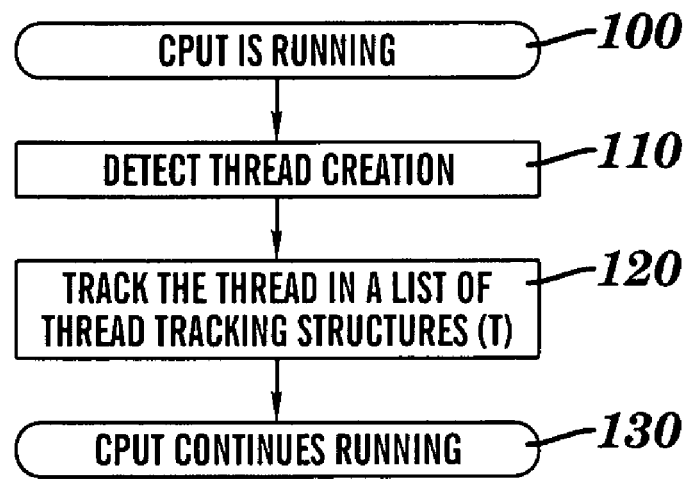
FIG. 1 illustrates an exemplary process for tracking thread creation according to an exemplary embodiment.

The detailed description explains exemplary embodiments, together with advantages and features, by way of example with reference to the drawings.

DETAILED DESCRIPTION

According to exemplary embodiments, a check is made for a situation in which a relatively low-priority thread holds a lock while relatively high-priority threads waiting for that lock consume CPU cycles. A check is also made for a situation in which a relatively low-priority thread repeatedly fails to acquire synchronization objects that are held by higher-priority threads, more often than not, when time slices arrive during which the low-priority thread could otherwise have executed.

According to an exemplary embodiment, the first of the above-described situations may be detected as follows. Beginning with a least frequently active thread in a list of thread tracking structures, a determination is made whether recorded events are currently listed for the thread. If recorded events are currently listed for the thread, a determination is made whether more than a predetermined percentage of the recorded events took place while other threads were waiting for synchronization objects held by the least frequently active thread. If more than the predetermined percentage of the recorded events took place while other threads were waiting for synchronization objects held by the least frequently active thread, thread starvation is indicated. The cause of such thread starvation is a situation in which a relatively low-priority thread holds a lock while relatively high-priority threads waiting for that lock consume CPU cycles.

According to an exemplary embodiment, the second of the above-described situations may be detected as follows. If no recorded events are listed for the thread or the percentage of recorded of events that took place while other threads were waiting for the thread does not exceed the predetermined percentage of recorded events, a determination is made whether there are timestamps currently listed for the thread. If there are timestamps currently listed for the thread, a determination is made whether the thread is currently waiting for a synchronization object. If the thread is currently waiting for a synchronization object, a determination is made whether the thread has been waiting longer than a predetermined percentage of time for the synchronization object. If the thread has been waiting longer than the predetermined percentage of time for the synchronization object, thread starvation is indicated. The cause of such thread starvation is a situation in which a relatively low-priority thread repeatedly fails to acquire synchronization objects that are held by higher-priority threads, more often than not, when time slices arrive during which the low-priority thread could otherwise have executed. Thread starvation detection is repeated for each of the remaining threads in the list of thread tracking structures, beginning with the next to least frequently active thread.

The various functions described herein may be implemented within a software runtime analysis tool. In one particular example, the various functions described herein may be implemented as extensions of one or more members of the Rational® PurifyPlus™ family of software analysis tools that are commercially available from International Business Machines Corporation of Armonk, N.Y. (IBM). PurifyPlus is a family of computer programs that provides runtime analysis functionality to software developers and testers. In general, runtime analysis refers to the practice of analyzing and understanding application behavior using data collected during execution of a CPUT.

The various development activities that may be analyzed using PurifyPlus may include, but are not limited to, memory corruption detection and memory profiling in native C/C++ applications, memory profiling in Java and .NET managed code applications, performance profiling to identify slow or inefficient portions of code, code coverage analysis, and runtime tracing. PurifyPlus may also perform thread profiling. Thread profiling may entail inspecting and preventing intermittent hangs, data corruption, or performance degradation due to deadlocks, race conditions, and/or thread starvation. The component of PurifyPlus that provides performance profiling of software applications is called Quantify.

According to an exemplary embodiment of the present invention, a profiling tool, such as Quantify, is extended to detect and point out thread starvation as a cause of poor software application performance. When a program is instrumented and run with Quantify, Quantify records data regarding function entry and exit times, in order to form a call graph. Quantify also records data regarding basic block entry and exit times. Quantify also collects data regarding the set of threads that run in the instrumented program. The call graph arcs, as shown in Quantify, are weighted to indicate where the most time was spent by the application. According to an exemplary embodiment, the weighting may be modified, or the nodes of the call graph may otherwise be highlighted, to indicate the functions associated with thread starvation.

According to an exemplary embodiment, the data collected at each function entry/exit event and at each basic block entry/exit event is augmented by tracking the thread associated with each of these events. This added tracking data may take the form of a list of thread IDs, sorted according to how often these events are tracked per thread. A "least-frequently used" (LFU) algorithm can be used to provide the ordering of this list. The sets of locks (synchronization objects) held by each thread may be tracked at all times, and, for a short time, any situation in which a thread is waiting for a lock may be tracked.

The following rules may then be applied. During any time interval in which the bottom-most (least active) threads on the list of thread tracking structures are found to be waiting for locks that are held by other threads, more often than not, those bottom-most threads may be considered starved. During any time interval in which the bottom-most threads on the list are found to be executing through various functions and basic blocks while holding locks that cause other threads to wait, more often than not, then those bottom-most threads may be considered starved, too. If neither of the above conditions is met, then no threads may be considered starved. This can be the case if the bottom-most threads are not waiting for locks or if they are holding locks but not causing other threads to wait.

According to exemplary embodiments, the terms "time interval" and "more often than not" may be understood as follows. For purposes of detecting thread starvation, situational data, involving threads list positions and associated wait states, need only be retained for a few seconds or minutes. The exact timespan might be determined by the overall duration of the run thus far. Or, the timespan may be user-specified. For example, if a likely thread starvation condition persists for less than, e.g., a total of five seconds during a lengthy run, then the impact of thread starvation to the program's users is likely to be minimal. A timespan determined by one of these methods is described as "time interval I" in the figures described below.

If a thread is found to be waiting for a lock, and if it is one of the bottom-most (least active) threads on the list, and if this situation continues for more than a few seconds, then the call graph may be modified to reflect the possibility of thread starvation along the call chain leading to the function in which that thread has gotten stuck. Or, if a thread is found to be holding one or more locks on which other threads are waiting, and if that thread is executing through various code even though it is one of the bottom-most (least active) threads on the list, then the call graph may be modified to reflect the possibility of thread starvation along the set of call chains in which that thread is executing.

Once there is no more waiting situation, the existence of that situation can be eventually forgotten, since the starvation condition can no longer apply, and the program's threads have seemingly moved on to different computation. The call graph data modifications, however, can remain, and the call graph data may be further modified as similar situations arise. That way, when the time comes to display results of the run to the user, the resulting call graph can indicate every instance of thread starvation found via the foregoing technique.

For each synchronization object used by a Computer Program Under Test (CPUT) there is a unique bit in a bitfield that is recognized by every routine in the thread starvation tool. This globally recognized bitfield can grow by one bit each time the CPUT creates a new synchronization object, or it can be preallocated based on the maximum number of synchronization objects allowable per process on the system. Either way, representations of this bitfield occur in the structures described below and are used for somewhat varying purposes within those structures.

Live threads may be tracked on a "thread list", which may be sorted by the "count of events" field (T3) described below for fast computation of the thread's activity level relative to other live threads. Thread creation can be intercepted via hooks or via system call interception on most systems. In Windows, for example, the interception can occur via a DllMain( ) routine that is invoked with a dwReason parameter that indicates a "thread attach" status. This routine can query the thread's ID and add the thread to the thread list. The thread tracking structure (T) may include these fields:

T1: The thread ID and/or handle.
T2: A reference to a list of event records (E, below).
T3: The count of events in list T2.
T4: A bitfield containing the same number of bits as the global bitfield, representing the set of synchronization objects held by the thread.
T5: A bitfield containing the same number of bits as the global bitfield, in which one bit may be stet to indicate which (if any) synchronization object is causing the thread to wait.
T6: A reference to a list of timestamps indicating when the thread was waiting for a synchronization signal object and when it was not waiting for a synchronization object.
T7: The count of timestamps recorded in list T6.

Detected events may be tracked on a set of "event lists". There may be one such list per live thread (that is, for each thread currently executing in the process and tracked in the thread list (T) described above). The detected events can include, e.g., function entry, function exit, basic block entry, and basic block exit. The event list includes records of every detected event, over a time interval, and can act as a FIFO queue of past events detected for the thread. Events that "age out" of the event list are purged from the list. Each event is associated with an event tracking structure (E) that may include the following fields.

E1: A timestamp
E2: A flag indicating that the event occurred while the thread held one or more synchronization objects that caused other threads to wait.

The list of synchronization objects currently being held by a given thread may be tracked on a "lock" list. There may be one global list that is referenced by the various threads that hold synchronization objects. This list may be ordered by synchronization object IDs or handles and thus implemented in a quickly searchable format, such as a skiplist, for fast access. Each synchronization object may be assigned a unique bit in a global bitfield, so that a particular set of synchronization objects is associated with a particular set of bits. An element in the lock list may be updated whenever a thread engages or disengages a synchronization object. Each synchronization object may be associated with a lock tracking structure (L) that may include the following fields:

L1: The synchronization object's ID and/or handle.
L2: A bitfield, containing the same number of bits as the global bitfield, in which a single bit is set that is unique to the synchronization object.
L3: A flag indicating whether a thread is waiting on the synchronization object.

FIG. 1 illustrates an exemplary process for tracking thread creation according to an exemplary embodiment. The method begins at step 100 at which a CPUT is running. At step 110, thread creation is detected. At step 120, the thread is tracked in a list of thread tracking structures (T). The CPUT continues running at step 130.

Figure 2:
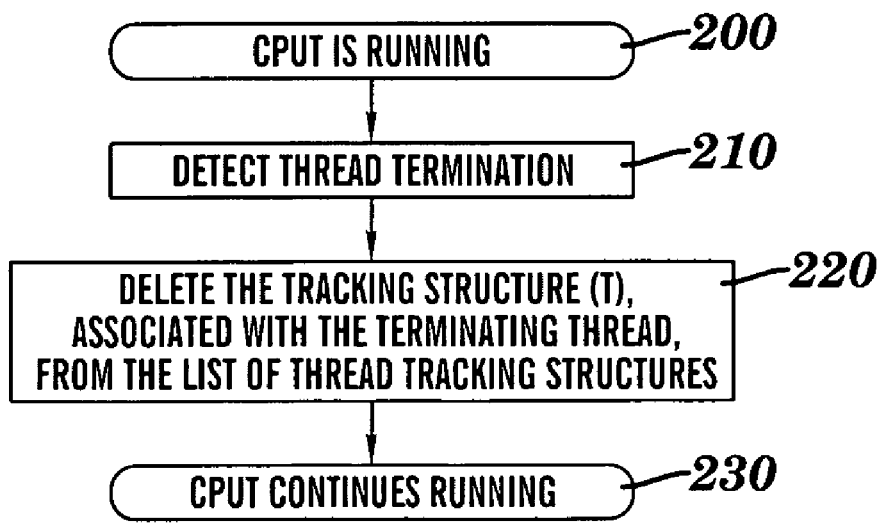
FIG. 2 illustrates an exemplary process for tracking thread termination according to an exemplary embodiment.

FIG. 2 illustrates an exemplary process for tracking thread termination according to an exemplary embodiment. At step 200, the CPUT is running. At step 210, thread termination is detected. At step 220, the tracking structure (T) associated with the terminated thread is deleted from the list of thread tracking structures. The CPUT continues running at step 230.

Figure 3:
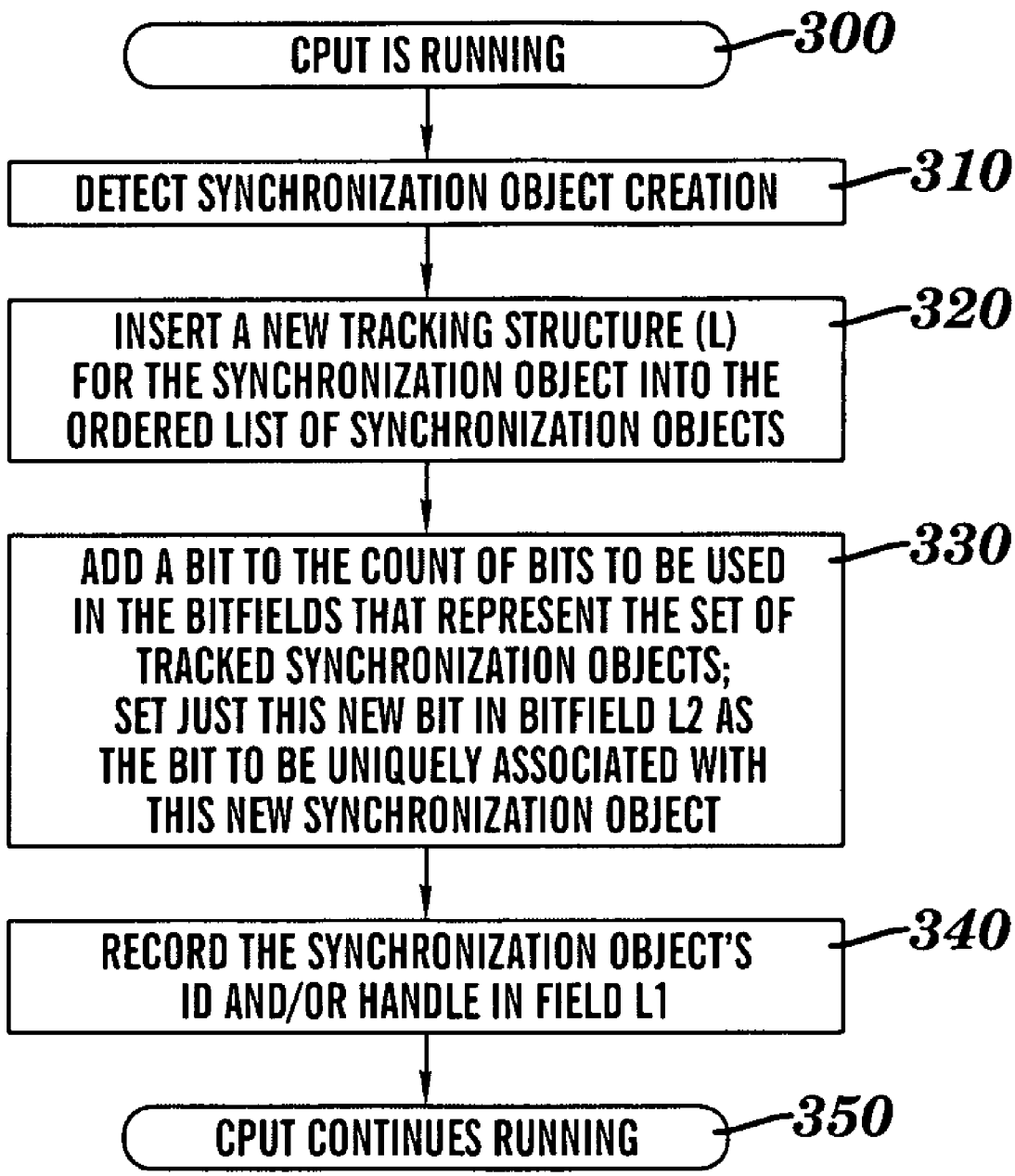
FIG. 3 illustrates an exemplary process for tracking synchronization object creation according to an exemplary embodiment.

FIG. 3 illustrates an exemplary process for tracking synchronization block creation according to an exemplary embodiment. At step 300, the CPUT is running. At step 310, synchronization object creation is detected. At step 320, a new tracking structure (L) is inserted for the synchronization object in the ordered list of synchronization objects. At step 330, a bit is added to the count of bits to be used in the bit fields that represent the set of tracked synchronization objects. This new bit is set, e.g., in field L2, as the bit to be associated with the new synchronization object. At step 340, the synchronization object's ID and/or handle is recorded, e.g., in field L1. The CPUT continues running at step 350.

Figure 4:
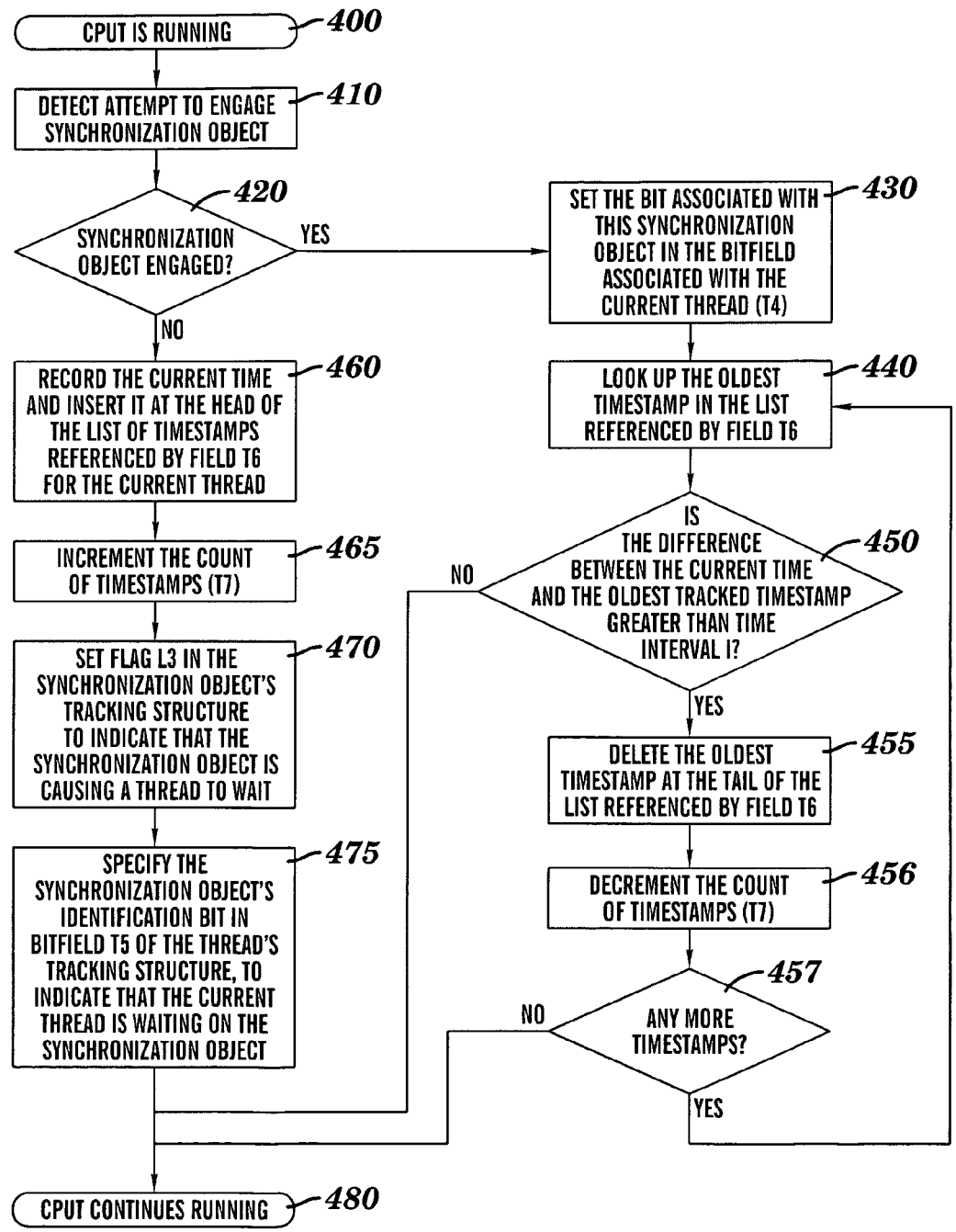
FIG. 4 illustrates an exemplary process for tracking a synchronization object's engagement by a thread according to an exemplary embodiment.

FIG. 4 illustrates an exemplary process for tracking a synchronization object's engagement with a thread according to an exemplary embodiment. The CPUT is running at step 400. At step 410, an attempt to engage a synchronization object is detected. At step 420, a determination is made whether this attempt is successful and the synchronization object is engaged by the current thread. If so, the process proceeds to step 430 at which the tracking structure (T) for the current thread, in the list of thread tracking structures, is accessed. The bit associated with the synchronization object is set in the bitfield associated with the current thread (e.g., T4) at step 430. At step 440, the oldest timestamp in the list associated with times at which the thread was waiting or for synchronization objects, e.g., referenced by field T6, is accessed. At step 450, a determination is made whether the difference between the current time stamp and the oldest time stamp is greater than a given time interval I. If not, the CPUT continues running at step 480. Otherwise, the oldest timestamp is deleted at the tail of the list referenced, e.g., by field T6, at step 455. At step 456, the count of timestamps is decremented, e.g., at field T7. At step 457, a determination is made whether there are any more timestamps. If so, the process returns to step 445. Otherwise, the CPUT continues running at step 480.

Referring again to step 420, if it is determined that an attempt to engage a synchronization object fails, the process proceeds to step 460 at which the tracking structure (T) for the current thread, in the list of thread tracking structures, is accessed. The current time is recorded and inserted at the head of the list of timestamps referenced, e.g., by field T6, for the current thread. At step 465, the count of time stamps is incremented, e.g., at field T7. At step 470, the tracking structure (L) for the synchronization object is accessed. A flag, e.g., L3, is set in the synchronization object's tracking structure to indicate that a thread is waiting on the synchronization object. At step 475, the synchronization object's identification bit in the bitfield (e.g., T5) of the thread tracking structure is specified to indicate that the current thread is waiting on the synchronization object. The process proceeds from there to step 480 at which the CPUT continues running.

Figure 5:
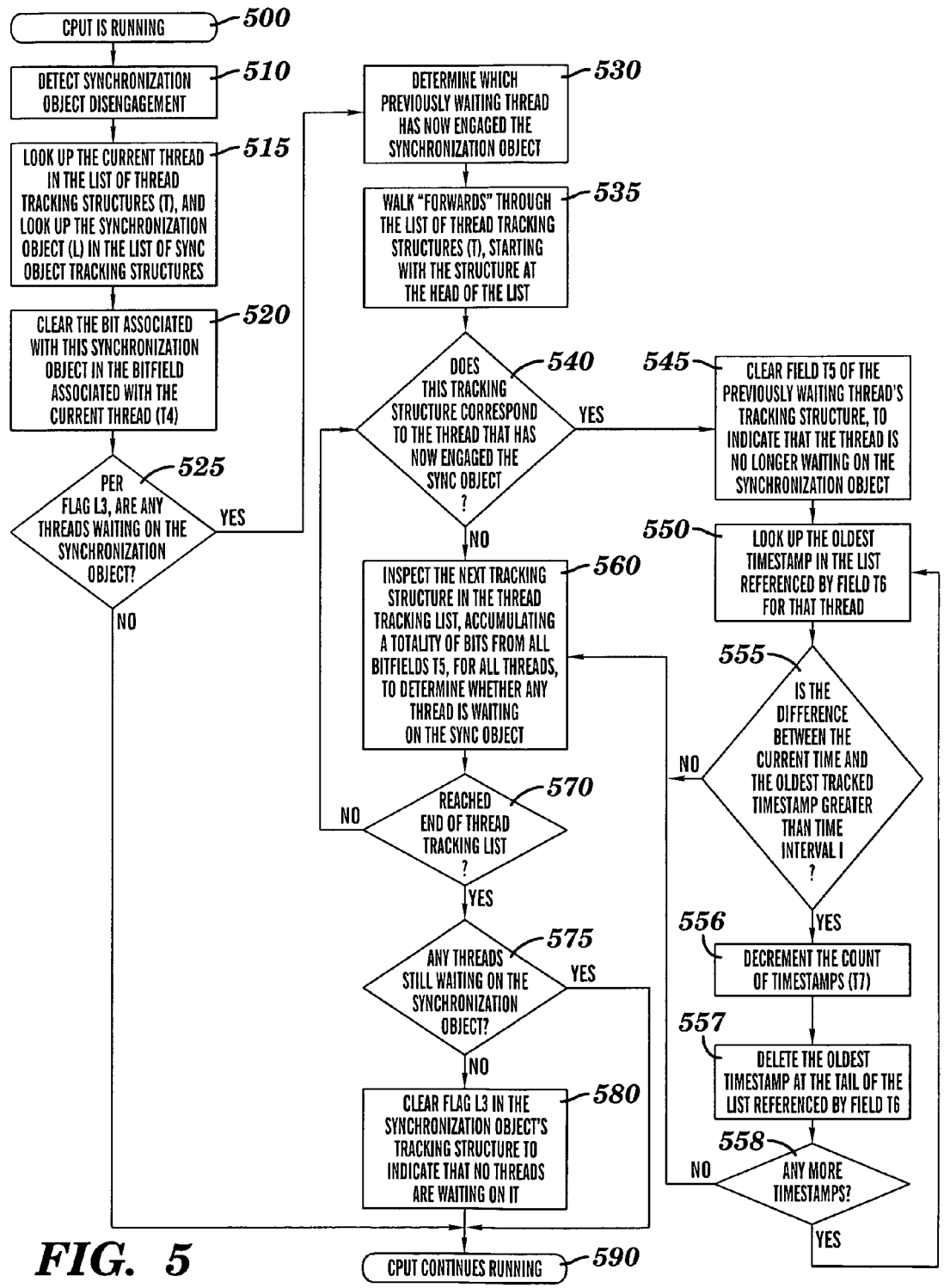
FIG. 5 illustrates an exemplary process for tracking a synchronization object's disengagement by a thread according to an exemplary embodiment.

FIG. 5 illustrates an exemplary process for tracking a synchronization object's disengagement with a thread according to an exemplary embodiment. At step 500, the CPUT is running. At step 510, synchronization object disengagement is detected. At step 515, the current thread in the list of current tracking structures (T) is looked up, along with the synchronization object (L) in the list of synchronization object tracking structures. At step 520, the bit associated with the synchronization object in the bitfield associated with the current thread (e.g., T4) is cleared. At step 525, a determination is made, e.g., per flag L3, whether there are any threads waiting on the synchronization object, based on the flag set as described with regard to FIG. 4. If there are no threads waiting on synchronization object, the process proceeds to step 590, and the CPUT continues running.

If there are threads waiting on the synchronization object, the previously waiting thread that has now engaged the synchronization object is determined at step 530. At step 535, the list of thread tracking structures (L) is traversed, starting with the structure at the head of the list. A step 540, a determination is made whether the tracking structure corresponds to the thread that has now engaged the synchronization object. If so, the field of the thread's tracking structure, e.g., T5, is cleared to indicate that the previously waiting thread is no longer waiting on the synchronization object at step 545. At step 550, the oldest timestamp in the list referenced by, e.g., field T6, is looked up for that thread. A determination is made at step 555 whether the difference between the current time and the oldest tracked timestamp is greater than a time interval I. If so, the count of timestamps (e.g., T7) is decremented at step 556, the oldest timestamp is deleted from the tail of the list referenced by, e.g., field T6, at step 557, and a determination is made whether there are many more timestamps at step 558. If there are more timestamps, the process returns to step 550.

If it is determined at step 540 that the tracking structure does not correspond to the thread that has engaged the synchronization object, or it is determined at step 555 that the difference between the current time and the oldest tracked timestamp is not greater than the time interval I, or it is determined at step 558 that there are no more timestamps, the process moves to step 560 at which the next tracking structure in the thread tracking list is inspected, and a totality of bits is accumulated from all bitfields (e.g., T5) for all threads to determine whether there is any thread waiting on the synchronization object. At step 570, a determination is made whether the end of the thread tracking list has been reached. If not, the process returns to step 540. Otherwise, the process proceeds to step 575, at which a determination is made whether there are any threads still waiting on the synchronization object. If there are any threads still waiting on the synchronization object, the process proceeds to step 590, at which the CPUT continues running. If there are no threads still waiting on the synchronization object, the flag (e.g., L3) in the synchronization object's tracking structure is cleared at step 580, and the CPUT continues running at step 590.

Figure 6:
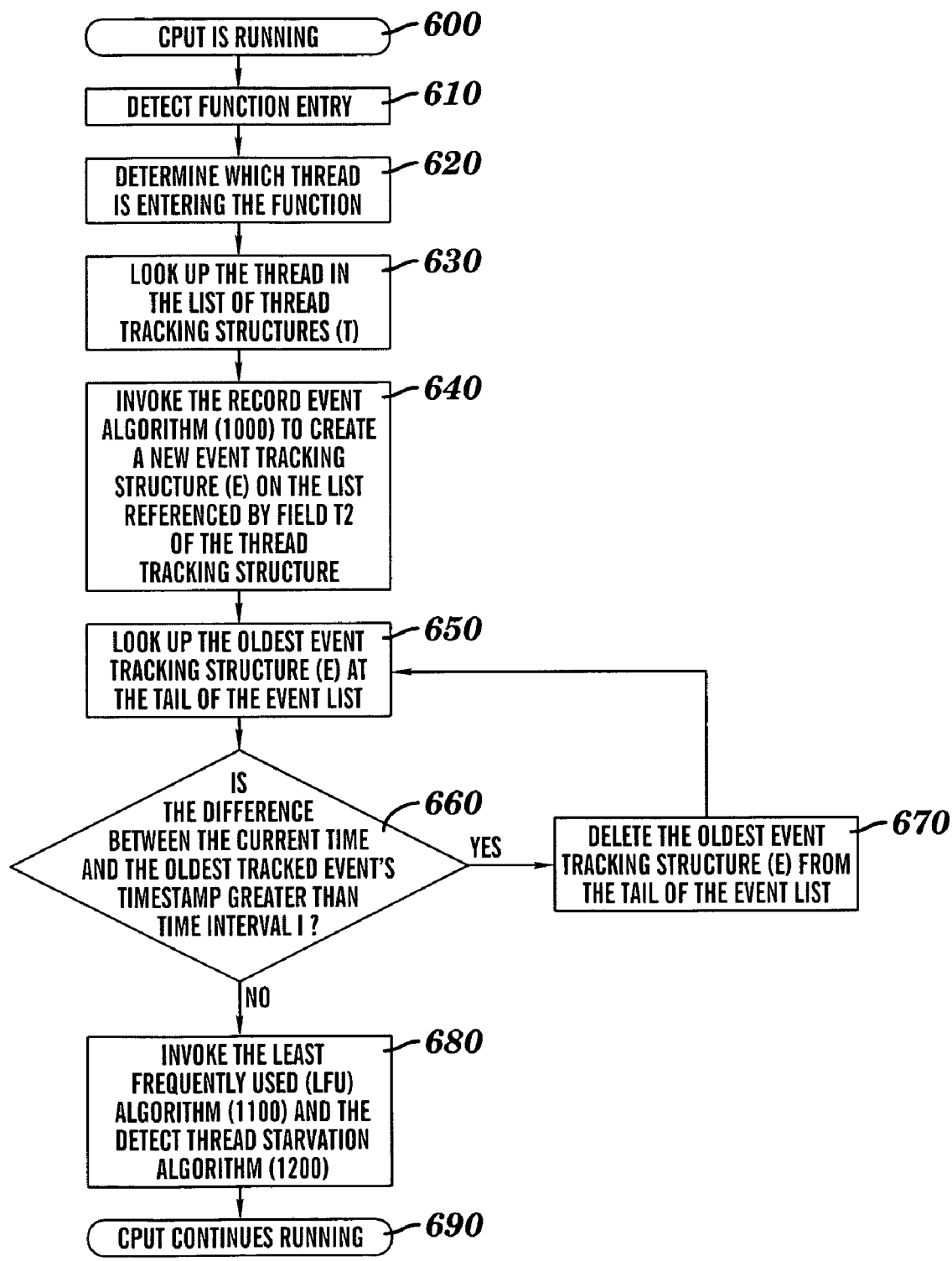
FIG. 6 illustrates an exemplary process for tracking function entry according to an exemplary embodiment.

FIG. 6 illustrates an exemplary process for tracking function entry according to an exemplary embodiment. At step 600, the CPUT is running. At step 610, a function entry is detected. At step 620, the thread that is entering the function is determined. At step 630, the thread is looked up in the list of thread tracking structures (T). At step 640, the record event algorithm (described below with reference to FIG. 10) is invoked to create a new event tracking structure (E) on the list referenced by, e.g., field T2 of the thread tracking structure. At step 650, the oldest event tracking structure (E) is looked up at the tail of the event list. At step 660, a determination is made whether the difference between the current time and the oldest tracked event's timestamp is greater than a time interval I. If it is, the oldest event tracking structure (D) is detected from the tail of the event list at step 670, and the process returns to step 650. Otherwise, the process proceeds to step 680 at which the least frequently used (LFU) algorithm (described below with reference to FIG. 11) and the thread starvation detection algorithm (described below with reference to FIG. 12) are invoked. The CPUT continues running at step 690.

Figure 7:
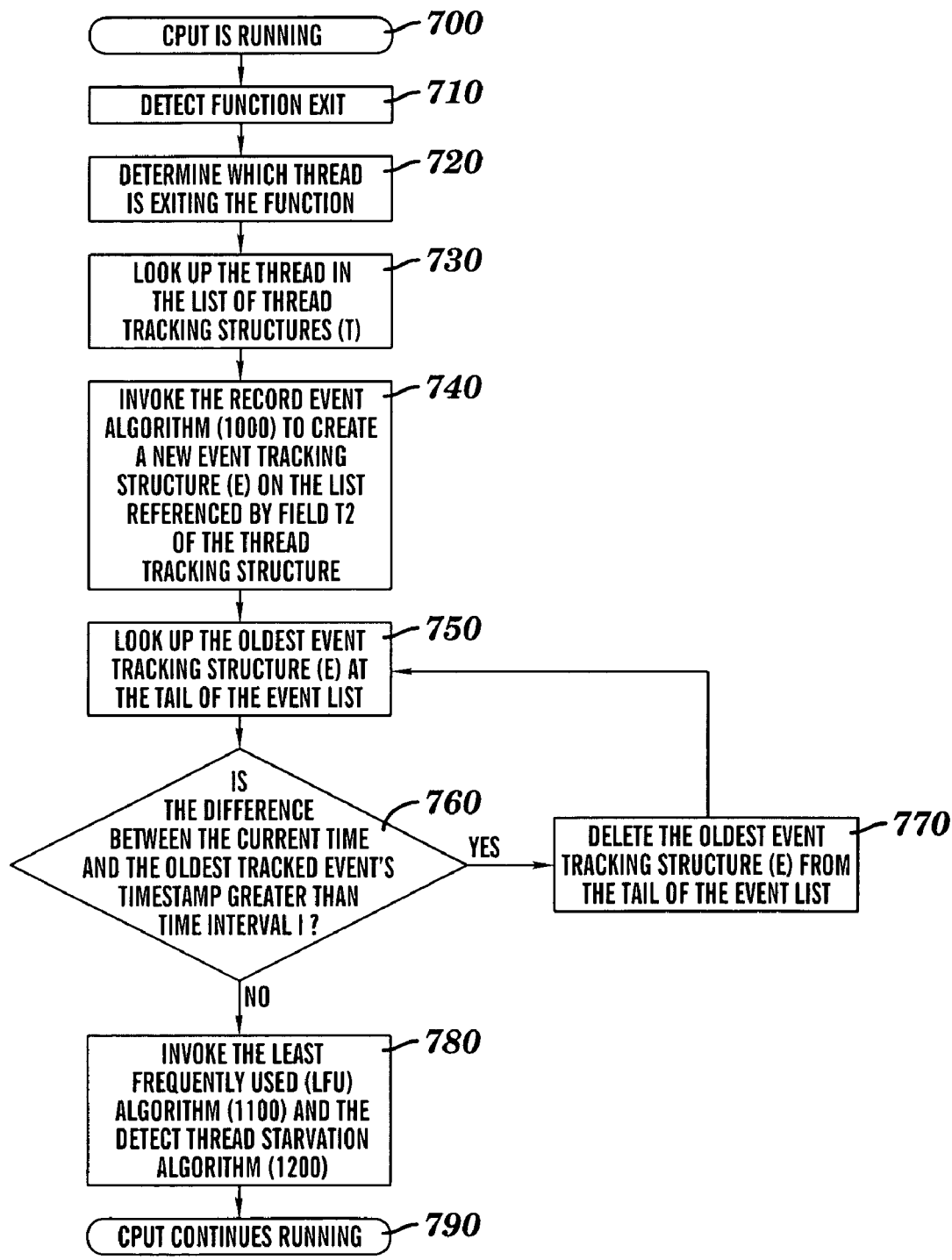
FIG. 7 illustrates an exemplary process for tracking function exit according to an exemplary embodiment.

FIG. 7 illustrates an exemplary process of tracking function exit according to an exemplary embodiment. The process begins at step 700 at which the CPUT is running. At step 710, a function exit is detected. At step 720, a determination is made which thread is exiting the function. At step 730, the thread in the list of thread tracking structures (T) is looked up. At step 740, a record event algorithm (described below with reference to FIG. 10) is invoked to create a new event tracking structure (E) on the list referenced by, e.g., field T2 of the thread tracking structure. At step 750, the oldest event tracking structure (E) is looked up at the tail of the event list. At step 760, a determination is made whether the difference between the current time and the oldest tracked event's timestamp is greater than a time interval I. If so, the oldest event tracking structure (E) is deleted from the tail of the event list at step 770, and the process returns to step 750. Otherwise, the process proceeds to step 780 at which the least frequently used (LFU) algorithm (1100) is invoked, along with the detect thread starvation algorithm (1200) described below. The CPUT continues running at step 790.

Figure 8:
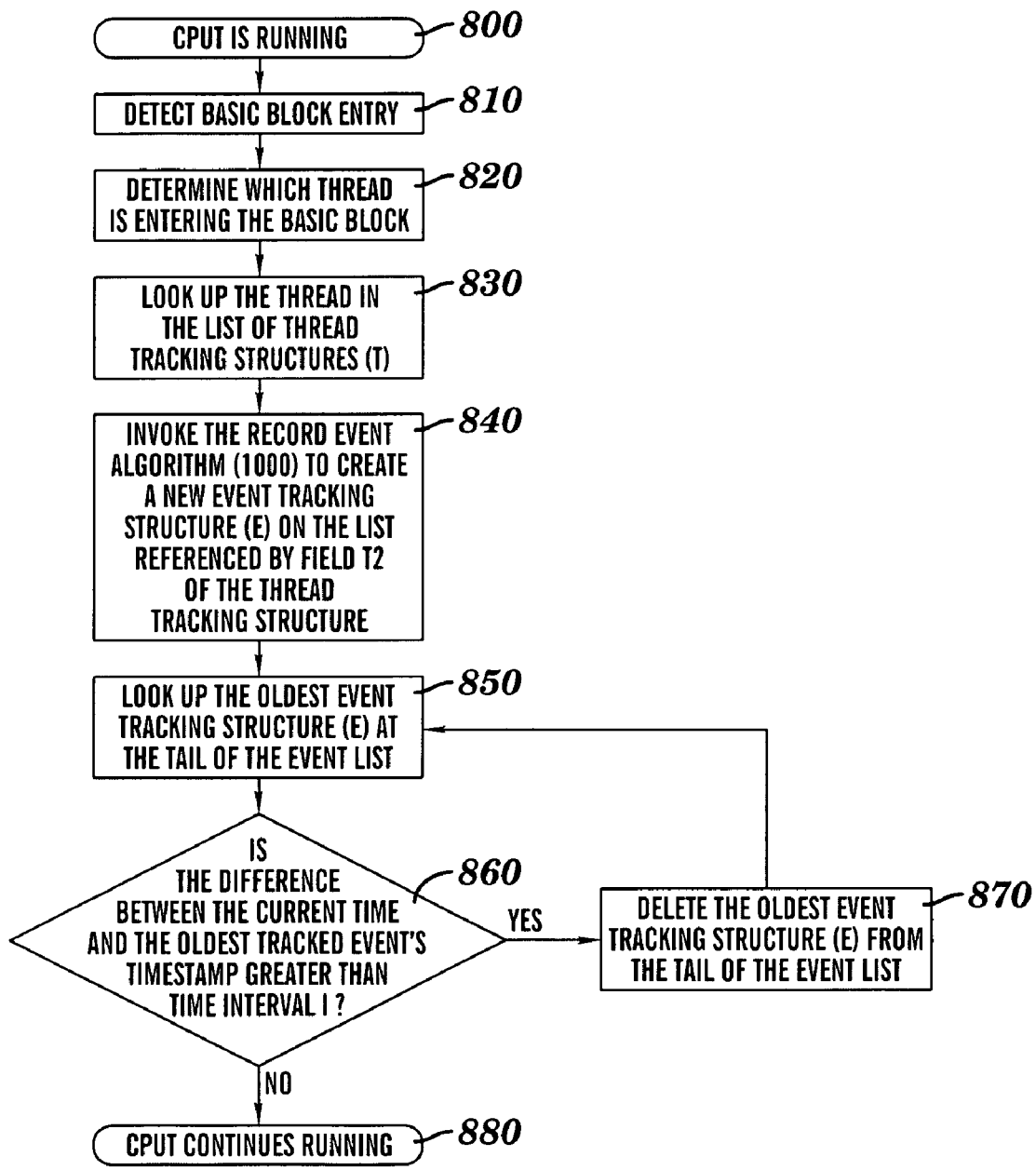
FIG. 8 illustrates a process for tracking basic block entry according to an exemplary embodiment.

FIG. 8 illustrates a process for tracking basic block entry according to an exemplary embodiment. At step 800, the CPUT is running. At step 810, a basic block entry is detected. At step 820 the thread that is entering the basic block is determined. At step 830, the thread in the list of thread tracking structures (T) is looked up. At step 840, the record event algorithm (1000) is invoked to create a new event tracking structure (E) on the list referenced by, e.g., field T2 of the thread tracking structure. At step 850, the oldest event tracking structure (E) is looked up at the tail of the list. At step 860, a determination is made whether the difference between the current time and the oldest tracked event's timestamp is greater than a time interval I. If so, the oldest event tracking structure (E) is deleted from the tail of the event list at step 870, and the process returns to step 850. Otherwise, in some embodiments, the least frequently used (LFU) algorithm (1100) can be invoked, along with the detect thread starvation algorithm (1200) described below. The process then proceeds to step 880, and the CPUT continues running.

Figure 9:
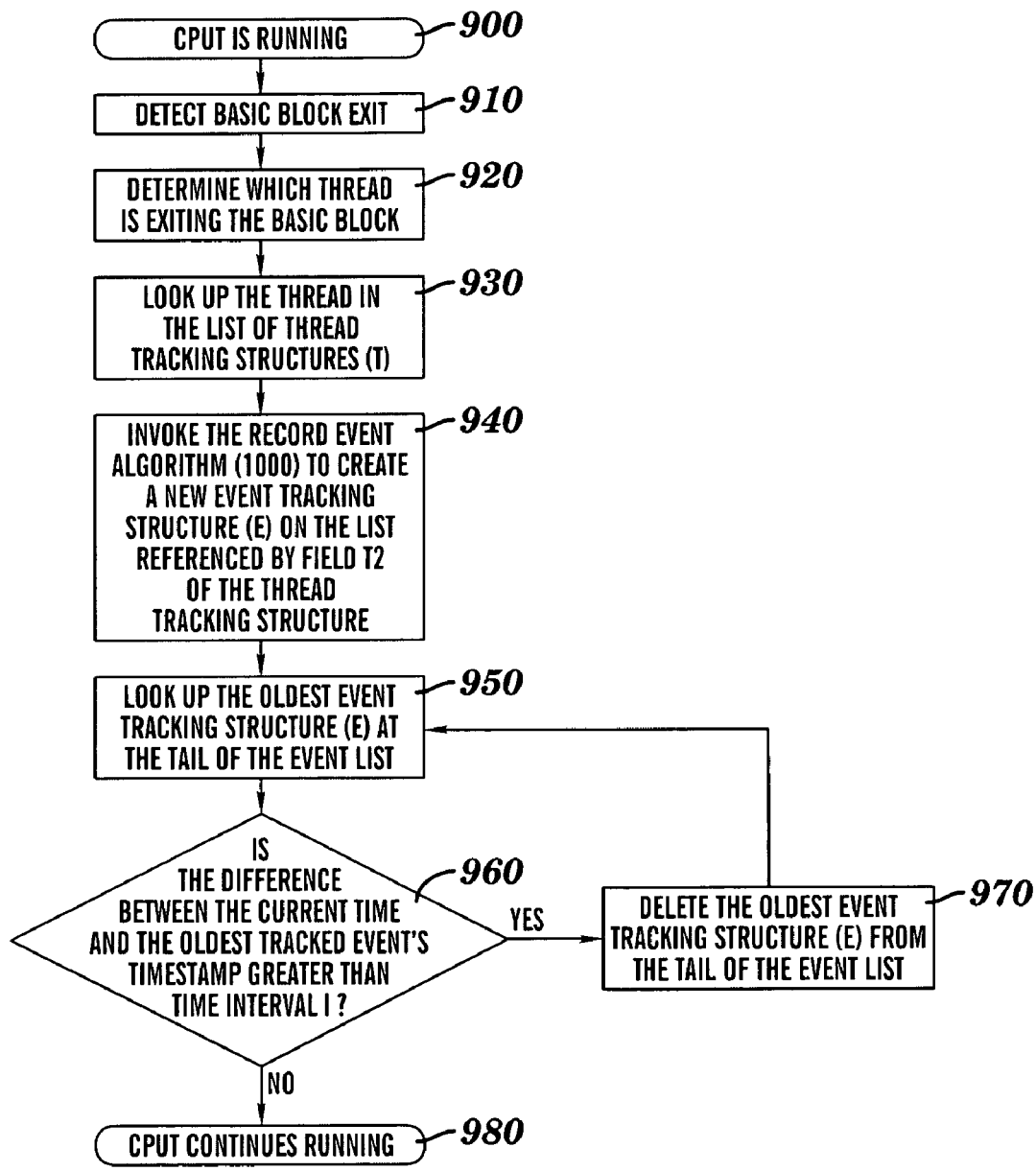
FIG. 9 illustrates a process for tracking basic block exit according to an exemplary embodiment.

FIG. 9 illustrates a process for tracking basic block exit according to an exemplary embodiment. At step 900, the CPUT is running. At step 910, the basic block exit is detected. At step 920, the thread that is exiting the basic block is determined. At step 930, the thread is looked up in the list of thread tracking structures (T). At step 940, the record event algorithm (1000) is invoked to create a new event tracking structure (E) on the list referenced by, e.g., field T2 of the thread tracking structure. At step 950, the oldest event tracking structure (E) is looked up at the tail of the event list. At step 960, a determination is made whether the difference between the current time and the oldest traced event's timestamp is greater than time interval I. If so, the oldest event tracking structure (E) is deleted from the tail of the event list at step 970, and the process returns to step 950. Otherwise, in some embodiments, the least frequently used (LFU) algorithm (1100) can be invoked, along with the detect thread starvation algorithm (1200) described below. The process then proceeds to step 980 at which the CPUT continues running.

Figure 10:
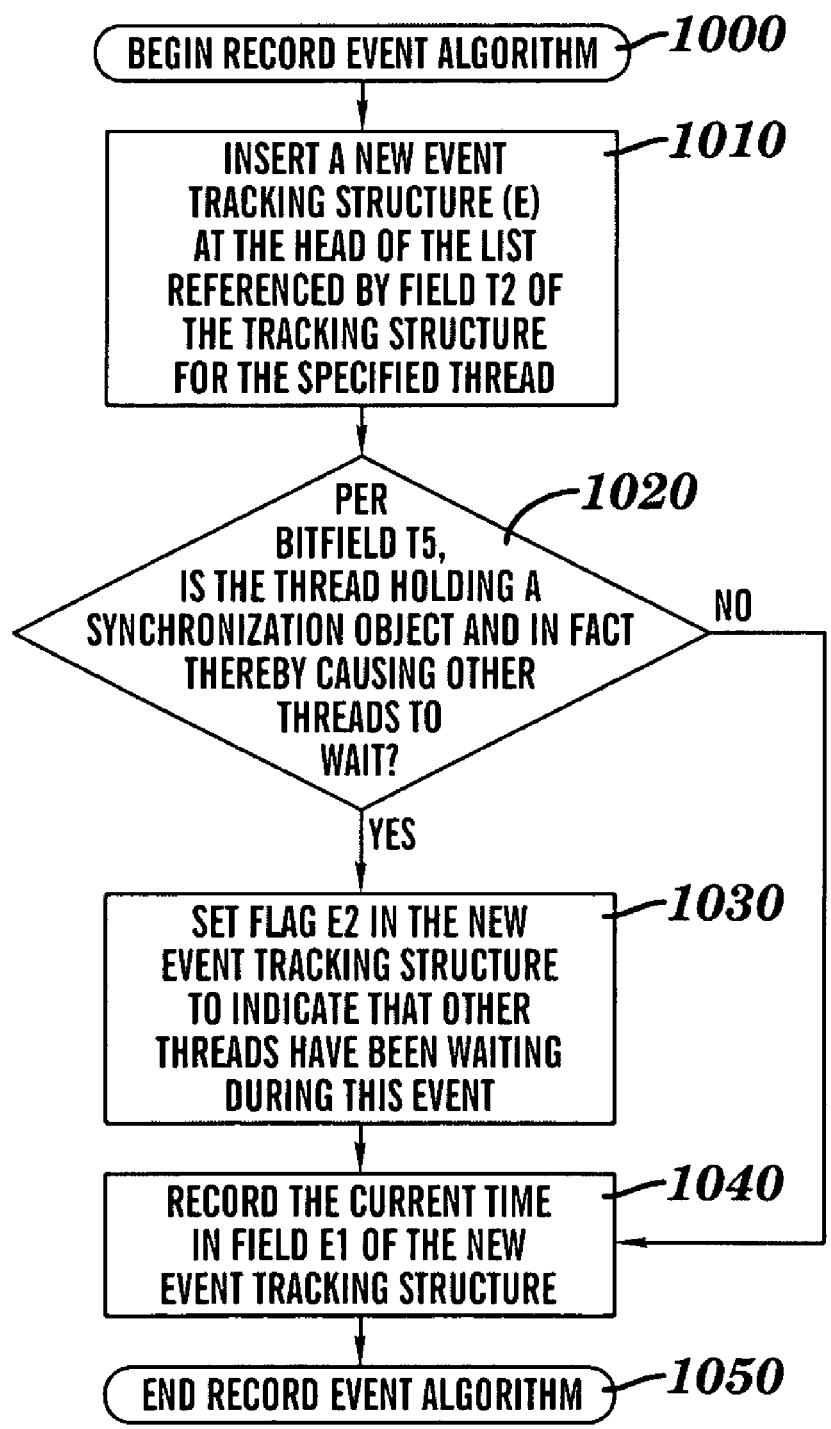
FIG. 10 illustrates a process for recording an event according to an exemplary embodiment.

FIG. 10 illustrates a process for recording an event according to an exemplary embodiment. The events recorded via this process can include, but are not limited to, function entry, function exit, basic block entry, and basic block exit. At step 1000, the record event algorithm is begun. At step 1010, a new event tracking structure (E) is inserted at the head of the list referenced by, e.g., field T2 of the tracking structure for the specified thread. At step 1020, a determination is made, for each bitfield (e.g., T5), whether the thread is holding a synchronization object, thereby causing other threads to wait. If so, a flag, e.g., E2, is set in the new event tracking structure to indicate that other threads have been waiting during this event. From a negative determination at step 1020 or from step 1030, the process proceeds to step 1040 at which the current time field E1 of the new event tracking structure is recorded. The process ends at step 1050.

Figure 11:
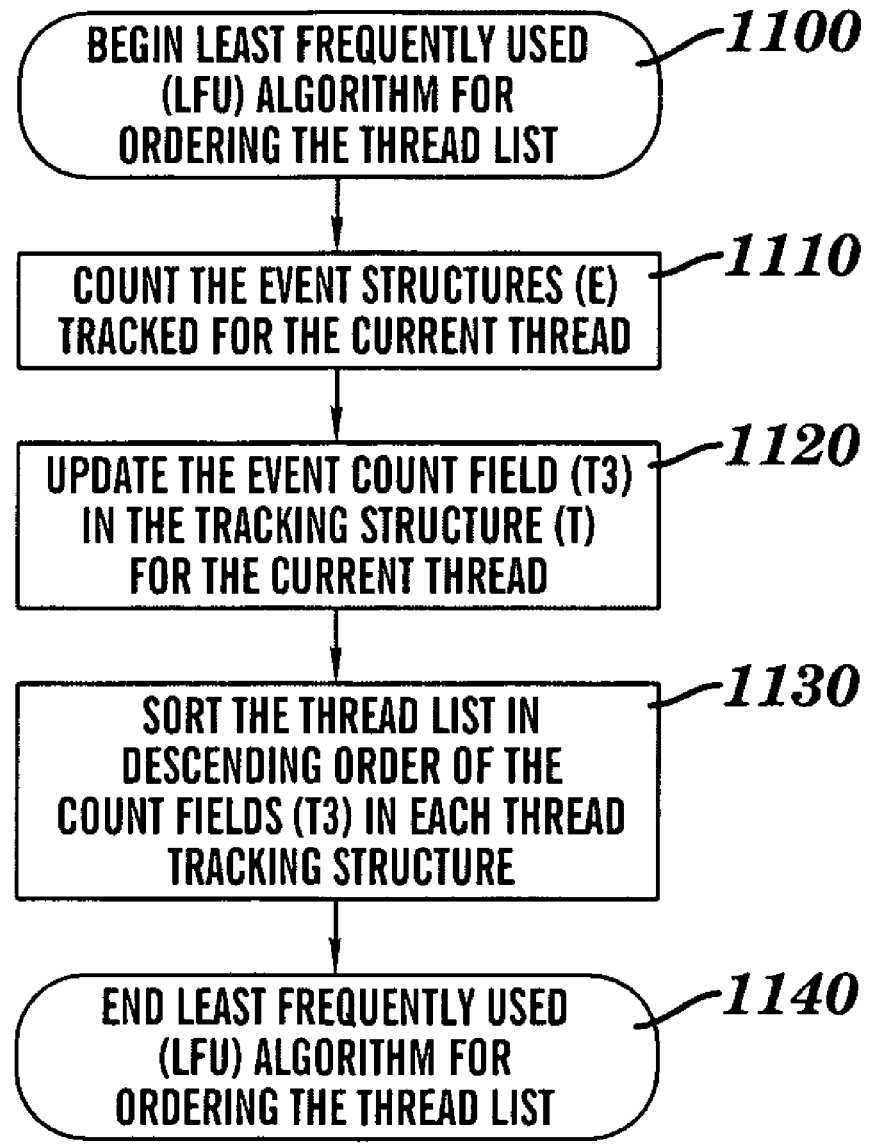
FIG. 11 illustrates a process for ordering a thread list according to an exemplary embodiment.

FIG. 11 illustrates a process for ordering a thread list according to an exemplary embodiment. At step 1100, the least frequently used (LFU) algorithm is begun for ordering the thread list. At step 1110, the event structures (E), tracked for the current thread, are counted. At step 1120, the event count field (e.g., T3) in the tracking structure (T) is updated for the current thread. At step 1130, the thread list is sorted in descending order of the count field (T3) in each thread tracking structure. At step 1140, the least frequently used algorithm for ordering the thread list ends.

Figure 12:
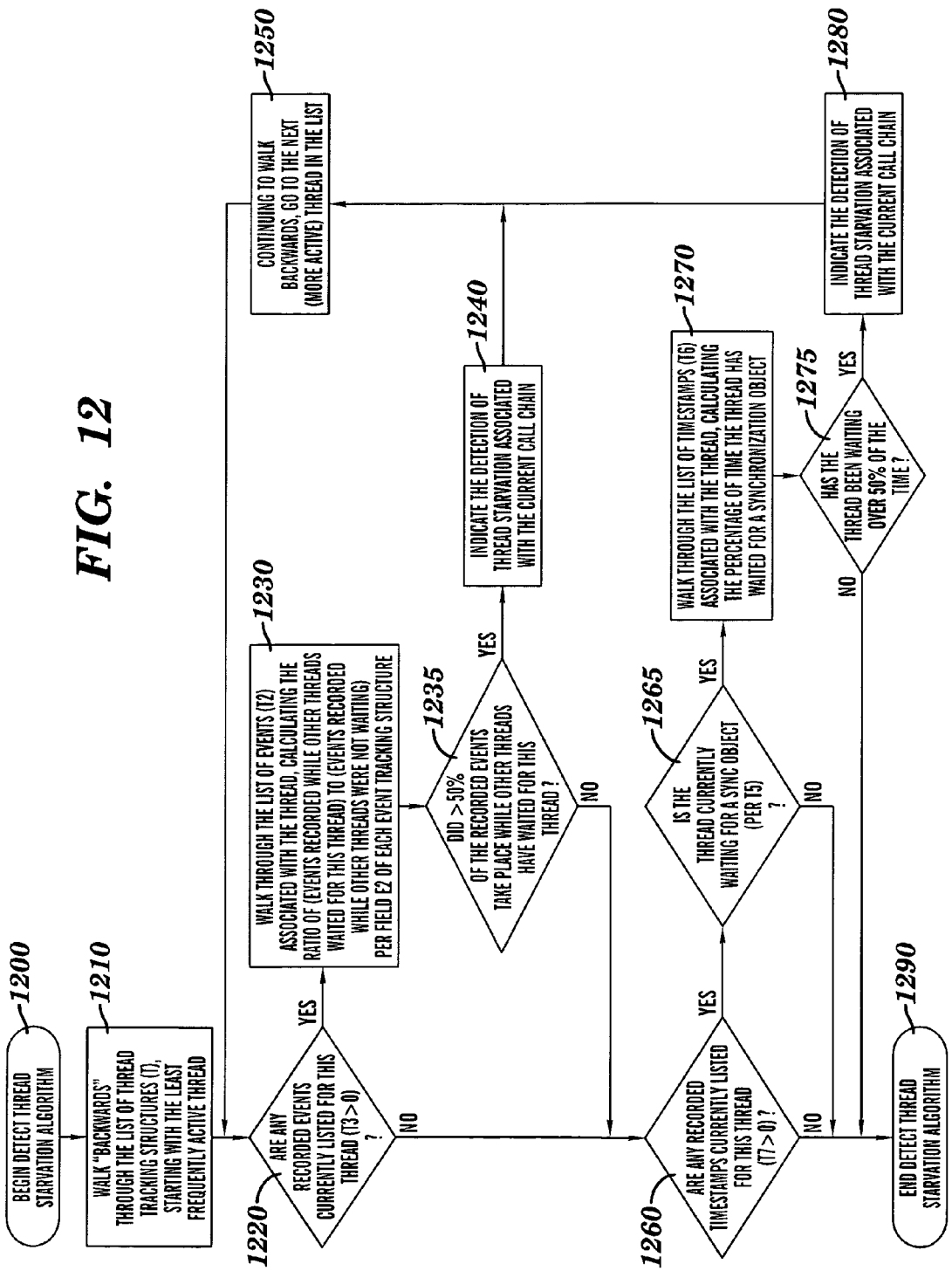
FIG. 12 illustrates a process for detecting thread starvation according to an exemplary embodiment.

FIG. 12 illustrates a method for detecting thread starvation according to an exemplary embodiment. The method begins at step 1200 at which thread starvation detection is initiated. At step 1210, the list of thread tracking structures (T) is traversed backwards, starting with the least frequently active thread. At step 1220, a determination is made whether there are any recorded events listed for the thread, e.g., whether for the least active thread, field T3>0. If so, the list of events associated with the thread is traversed, and the ratio of events recorded while other threads were waiting for that thread to the events recorded while other threads were not waiting is calculated at step 1230. At step 1235, a determination is made whether over a predetermined percentage, e.g., over 50%, of the recorded events took place while other threads waited for that thread. If so, an indication of thread starvation associated with the current call chain is made at step 1240. The cause of the thread starvation may also be indicated: this appears to be a situation in which a relatively low-priority thread holds a synchronization object while relatively high-priority threads waiting for that synchronization object continue processing. After this indication is given, the list is traversed again at step 1250, starting with the next to least active thread in the list, and the process returns to step 1220.

If, at step 1220, it is determined that there are no recorded events for this thread or if, at step 1235, it is determined the recorded events that took place while other threads were waiting for this thread is equal to or less than the predetermined percentage, e.g., 50%, the process proceeds to step 1260. At step 1260, a determination is made whether there are any recorded timestamps listed for the thread, e.g., whether T7>0. If so, a determination is made at step 1265 whether the thread is waiting on a synchronization object. If so, the list of timestamps (e.g., T6) associated with the thread is traversed, and the percentage of time the thread has waited for a synchronization object is calculated at step 1270. At step 1275, a determination is made whether the thread has been waiting over a predetermined percentage of time, e.g., over 50% of the time. If so, an indication of thread starvation associated with the current call chain is made at step 1280, and the process proceeds to step 1250. The cause of the thread starvation may also be indicated, e.g., for a situation in which a relatively low-priority thread is unable to acquire one or more synchronization objects that are held, more often than not, by threads of higher priority.

If negative determinations are made at steps 1260, 1265 or 1275, the process proceeds to step 1290, and which thread starvation detection is ended. (See note on drawings.)

Figure 13:
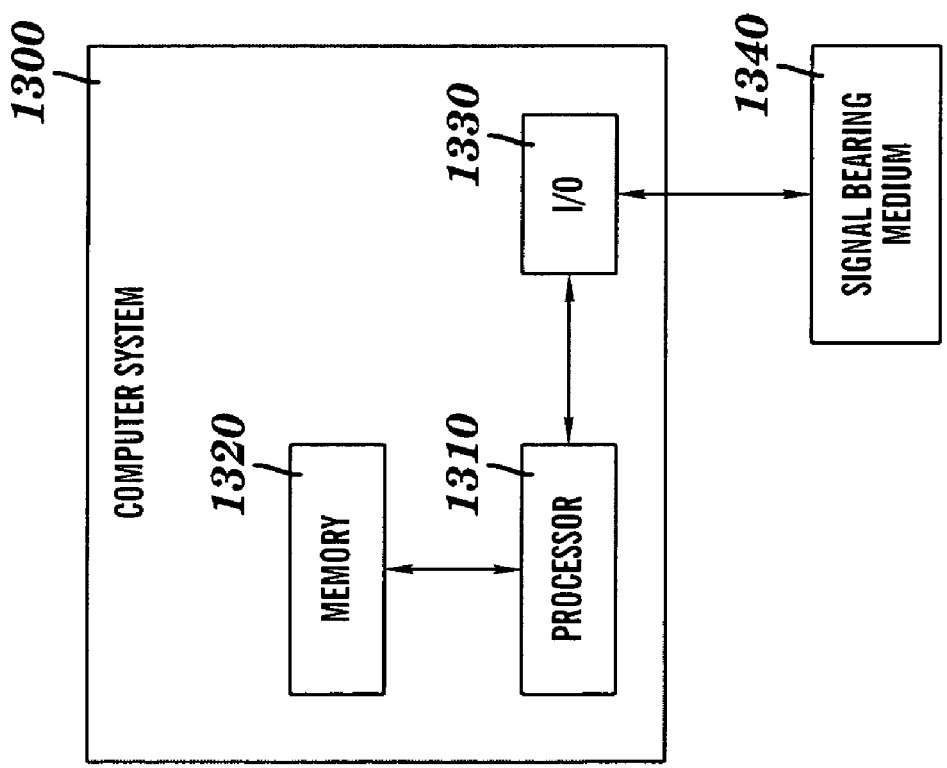
FIG. 13 illustrates a system including a computer program runtime analysis product for detecting thread starvation according to an exemplary embodiment.

FIG. 13 illustrates an exemplary system for timing according to exemplary embodiments. The system includes a computer 1300 in contact with a signal bearing medium 1340 via an input/output interface 1330. The signal bearing medium 1340 may include a component or tool for detecting thread starvation that may run in conjunction with a Computer Program Under Test (CPUT) and that may be implemented as, e.g., information permanently stored on non-writable storage media (e.g., read-only memory devices within a computer, such as CD-ROM disks readable by a CD-ROM drive), alterable information stored on a writeable storage media (e.g., floppy disks within a diskette drive or hard-disk drive), information conveyed to a computer by a communications medium, such as through a computer or telephone network, including wireless and broadband communications networks, such as the Internet, etc.

The computer includes a processor 1310 that runs a program under test that is instrumented for runtime analysis using the thread starvation detection program represented, e.g., on the signal bearing medium 1340 and communicated to the computer via the input/output interface 1330. The thread starvation detection program stored on the signal bearing medium may also be saved into memory 1320, e.g., via communication with the I/O interface 1330 and the signal bearing medium 1340. The processor 1310 analyzes a program under test using the thread starvation detection program and may save results into memory 1330. The process for detecting thread starvation in a program under test may be embodied as a program within the memory 1320 or on a signal bearing medium, such as the medium 1340, and executed by the processor 1310. Alternatively, the program under test may be embodied as a program within the memory or on a signal bearing medium, respectively.

The capabilities of the present invention can be implemented in software, firmware, hardware or some combination thereof. The capabilities of the present invention can be implemented as part of a runtime analysis tool for use with various computer programs that may be analyzed, or specifically built into a program to be analyzed, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments have been described, it will be understood that those skilled in the art, both now and in the future, may make various improvements and enhancements which fall within the scope of the claims which follow.

These claims should be construed to maintain the proper protection for the invention first described.

What is claimed is:

1. A method for detecting thread starvation in a running program under test, comprising:
   determining whether recorded events are currently listed for a least frequently used active thread in a list of thread tracking structures;
   determining whether more than a predetermined percentage of recorded events took place while other threads were waiting for a synchronization object held by the least frequently used active thread, responsive to determining that recorded events are currently listed for the least frequently used active thread; and
   indicating detection of thread starvation while the program under test is running responsive to determining that more than the predetermined percentage of recorded events took place while other threads were waiting for the synchronization object held by the least frequently used active thread;
   for the remaining threads in the list of thread tracking structures, iteratively performing the steps of:
   identifying a next least frequently used active thread in the list of thread tracking structures; determining whether recorded events are currently listed for the next least frequently used active thread, determining whether more than a predetermined percentage of recorded events took place while other threads were waiting for the synchronization objects held by the next least frequently used active thread for which recorded events are currently listed for the next least frequently used active thread, and indicating detection of thread starvation if more than the predetermined percentage of recorded events took place while other threads were waiting for the synchronization objects held by the next least frequently used active thread;
   wherein a cause of the thread starvation indicated is a low-priority thread holding a lock while a high-priority thread is waiting.

2. The method of claim 1, further comprising determining whether any recorded timestamps are currently listed for the least frequently used active thread if no recorded events are listed for the least frequently used active thread or if the percentage of recorded events that took place while other threads were waiting for the least frequently used active thread does not exceed the predetermined percentage.

3. The method of claim 2, further comprising determining whether the least frequently used active thread is currently waiting for the synchronization object if recorded timestamps are currently listed for the least frequently used active thread, indicating that the least frequently used active thread is active while waiting.

4. The method of claim 3, further comprising determining whether the least frequently used active thread has been waiting for a synchronization object longer than a predetermined percentage of time.

5. The method of claim 4, further comprising indicating thread starvation while the program under test is running, if the least frequently used active thread has been waiting for the synchronization object more often than the predetermined percentage of time.

6. The method of claim 5, further comprising, for each of the threads in the list of thread tracking structures, repeating determining whether any recorded timestamps are currently listed for the thread if no recorded events are listed for the thread or if the percentage of recorded of events that take place while other threads were waiting for the synchronization objects held by the thread does not exceed the predetermined percentage, determining whether the thread is currently waiting for a synchronization object if timestamped events are currently listed for the thread, determining whether the thread has been waiting for a synchronization object more often than a predetermined percentage of time while generating timestamped events, and indicating thread starvation if the thread has been waiting for the synchronization object more often than the predetermined percentage of time, for the remaining threads in the list, beginning with the next to least frequently used active thread in the list of thread tracking structures.

7. A computer program product for detecting thread starvation in a running program under test, comprising a non-transitory computer usable storage medium having a computer readable program, wherein the computer readable program, when executed on a computer, causes the computer to:
   determine whether recorded events are currently listed for a least frequently used active thread in a list of thread tracking structures;
   determine whether more than a predetermined percentage of recorded events took place while other threads were waiting for a synchronization object held by the least frequently used active thread, responsive to determining that recorded events are currently listed for the least frequently used active thread; and
   indicate detection of thread starvation while the program under test is running responsive to determining that more than the predetermined percentage of recorded events took place while other threads were waiting for the synchronization object held by the least frequently used active thread;
   for the remaining threads in the list of thread tracking structures, iteratively perform the steps of:
   identify a next least frequently used active thread in the list of thread tracking structures; determine whether recorded events are currently listed for the next least frequently used active thread, determine whether more than a predetermined percentage of recorded events took place while other threads were waiting for the synchronization objects held by the next least frequently used active thread for which recorded events are currently listed for the next least frequently used active thread, and indicate detection of thread starvation if more than the predetermined percentage of recorded events took place while other threads were waiting for the synchronization objects held by the next least frequently used active thread;
   wherein a cause of the thread starvation indicated is a low-priority thread holding a lock while a high-priority thread is waiting.

8. The computer program product of claim 7, wherein the non-transitory computer readable program further causes the computer to determine whether any recorded timestamps are currently listed for the least frequently used active thread if no recorded events are listed for the least frequently used active thread or if the percentage of recorded of events that take place while other threads were waiting for the least frequently used active thread does not exceed the predetermined percentage, wherein the computer readable medium further causes the computer to determine whether the least frequently used active thread is currently waiting for the synchronization object if recorded timestamps are currently listed for the least frequently used active thread, indicating that the least frequently used active thread is active while waiting.

9. The computer program product of claim 7, wherein the non-transitory computer readable medium further causes the computer to determine whether the least frequently used active thread has been waiting for the synchronization object more often than the predetermined percentage of time.

10. The computer program product of claim 9, wherein the non-transitory computer readable medium further causes the computer to indicate thread starvation while the program under test is running if the least frequently used active thread has been waiting for the synchronization object longer than the predetermined percentage of time.

11. The computer program product of claim 10, wherein the non-transitory computer program product causes the computer to determine whether any recorded timestamps are currently listed for the least frequently used active thread if no recorded events are listed for the least frequently used active thread or if the percentage of recorded of events that take place while other threads were waiting for the synchronization object held by the least frequently used active thread does not exceed the predetermined percentage, determine whether the least frequently used active thread is currently waiting for a synchronization object if recorded timestamped events are currently listed for the least frequently used active thread, determine whether the least frequently used active thread has been waiting for a synchronization object more often than a predetermined percentage of time while generating timestamped events, and indicate thread starvation if the least frequently used active thread has been waiting for the synchronization object more often than the predetermined percentage of time for each of the remaining threads in the list of thread tracking structures, beginning with the next to least frequently used active thread in the list of thread tracking structures.

12. An apparatus for detecting thread starvation in a running program under test, comprising:
   an input for receiving the running program under test; and
   a processor configured to:
      determining whether recorded events are currently listed for a least frequently used active thread in a list of thread tracking structures;
      determining whether more than a predetermined percentage of recorded events took place while other threads were waiting for a synchronization object held by the least frequently used active thread, responsive to determining that recorded events are currently listed for the least frequently used active thread; and
   indicating detection of thread starvation while the program under test is running responsive to determining that more than the predetermined percentage of recorded events took place while other threads were waiting for the synchronization object held by the least frequently used active thread;
   for the remaining threads in the list of thread tracking structures, iteratively performing the steps of:
   identifying a next least frequently used active thread in the list of thread tracking structures; determining whether recorded events are currently listed for the next least frequently used active thread, determining whether more than a predetermined percentage of recorded events took place while other threads were waiting for the synchronization objects held by the next least frequently used active thread for which recorded events are currently listed for the next least frequently used active thread, and indicating detection of thread starvation if more than the predetermined percentage of recorded events took place while other threads were waiting for the synchronization objects held by the next least frequently used active thread;
   wherein a cause of the thread starvation indicated is a low-priority thread holding a lock while a high-priority thread is waiting.

13. The apparatus of claim 12, wherein the processor determines whether any recorded timestamps are currently listed for the least frequently used active thread if no recorded events are listed for the least frequently used active thread or if the percentage of recorded of events that take place while other thread were waiting for the least frequently used active thread does not exceed the predetermined percentage.

14. The apparatus of claim 13, wherein the processor determines whether the least frequently used active thread is currently waiting for a synchronization object if recorded timestamps are currently listed for the least frequently used active thread, indicating that the least frequently used active thread is active while waiting.

15. The apparatus of claim 14, wherein the processor determines whether the least frequently used active thread has been waiting for a synchronization object longer than a predetermined percentage of time.

16. The apparatus of claim 15, wherein the processor indicates thread starvation while the program under test is running if the least frequently used active thread has been waiting for the synchronization object more often than the predetermined percentage of time.

17. The apparatus of claim 16, wherein the processor determines whether any recorded timestamps are currently listed for the least frequently used active thread if no recorded events are listed for the least frequently used active thread or if the percentage of recorded of events that take place while other thread were waiting for the synchronization object held by the least frequently used active thread does not exceed the predetermined percentage, determines whether the least frequently used active thread is currently waiting for a synchronization object if recorded timestamped events are currently listed for the least frequently used active thread, determines whether the least frequently used active thread has been waiting for a synchronization object longer than a predetermined percentage of time, and indicates thread starvation if the least frequently used active thread has been waiting for the synchronization object more often than the predetermined percentage of time for each of the remaining threads in the list, beginning the next to least frequently used active thread in the list of thread tracking structures.

* * * * *